US012007371B2

(12) United States Patent
Cormier et al.

(10) Patent No.: US 12,007,371 B2
(45) Date of Patent: Jun. 11, 2024

(54) REMOVABLE SEAL DEVICE FOR FLUIDIC COUPLING

(71) Applicant: Waters Technologies Corporation, Milford, MA (US)

(72) Inventors: Sylvain Gilles Cormier, Mendon, MA (US); Joseph D. Antocci, Leominster, MA (US); Wade P. Leveille, Sr., Douglas, MA (US)

(73) Assignee: Waters Technologies Corporation, Milford, MA (US)

( * ) Notice: Subject to any disclaimer, the term of this patent is extended or adjusted under 35 U.S.C. 154(b) by 559 days.

(21) Appl. No.: 16/822,769

(22) Filed: Mar. 18, 2020

(65) Prior Publication Data
US 2020/0300821 A1   Sep. 24, 2020

Related U.S. Application Data

(60) Provisional application No. 62/820,501, filed on Mar. 19, 2019.

(51) Int. Cl.
*F16L 15/04*     (2006.01)
*G01N 30/60*     (2006.01)
*G01N 30/02*     (2006.01)

(52) U.S. Cl.
CPC .......... *G01N 30/6026* (2013.01); *F16L 15/04* (2013.01); *G01N 2030/027* (2013.01)

(58) Field of Classification Search
CPC ..... F16L 19/0212; F16L 19/06; F16L 19/061; F16L 19/07; F16L 21/007; F16L 21/03;
(Continued)

(56) References Cited

U.S. PATENT DOCUMENTS 2,812,959 A   11/1957  Fuller
3,141,686 A    7/1964  Smith
(Continued)

FOREIGN PATENT DOCUMENTS

CN   101960200 A    1/2011
CN   102239408 A   11/2011
(Continued)

OTHER PUBLICATIONS

International Preliminary Report on Patentability in PCT/US2020/045940 dated Feb. 24, 2022.
(Continued)

*Primary Examiner* — Aaron M Dunwoody
(74) *Attorney, Agent, or Firm* — Schmeiser, Olsen & Watts LLP; Victor J. Baranowski

(57) ABSTRACT

A removable seal device for fluidic coupling includes a seal body extending between a first end and a second end, the seal body including an inner channel configured to receive a flow of a fluid. The first end of the seal body includes a first sealing surface configured to create a first seal with a fitting sealing surface of a receiver fitting, and the seal body includes a second sealing surface configured to create a second seal with an end of a fluidic tube. The removable seal is configured to be removably secured to at least one of the fluidic tube, a support feature fixed to the fluidic tube, and a compression screw, such that untightening of the compression screw from the receiver fitting causes the removable seal device to be removed from the receiver fitting.

20 Claims, 12 Drawing Sheets

(58) Field of Classification Search
CPC ......... F16L 21/04; F16L 33/223; F16L 15/00; F16L 15/001; F16L 19/063; G01N 30/6026
See application file for complete search history.

(56) References Cited

U.S. PATENT DOCUMENTS

| | | | |
|---|---|---|---|
| 3,582,115 A | | 6/1971 | Clague |
| 4,281,679 A | * | 8/1981 | Stearns ................. F16L 29/02 |
| | | | 137/550 |
| 4,619,473 A | | 10/1986 | Someya |
| 4,690,437 A | | 9/1987 | Anderson, Jr. |
| 4,865,363 A | | 9/1989 | Takahashi |
| 5,423,581 A | | 6/1995 | Salyers |
| 5,651,886 A | | 7/1997 | Hoffmann et al. |
| 5,669,637 A | | 9/1997 | Chitty et al. |
| 6,095,572 A | | 8/2000 | Ford et al. |
| 6,273,478 B1 | | 8/2001 | Benett et al. |
| 6,923,792 B2 | | 8/2005 | Staid et al. |
| 7,025,360 B2 | | 4/2006 | Walker et al. |
| 7,467,799 B1 | | 12/2008 | Tarlton |
| 8,201,854 B2 | | 6/2012 | Ford et al. |
| 8,569,070 B2 | | 10/2013 | Ellis et al. |
| 9,151,734 B2 | | 10/2015 | Ellis et al. |
| 9,212,747 B2 | | 12/2015 | Wagner et al. |
| 9,267,630 B2 | | 2/2016 | Dehmer |
| 9,334,989 B2 | | 5/2016 | Jencks et al. |
| 9,482,649 B2 | | 11/2016 | Lueth et al. |
| 9,494,563 B2 | | 11/2016 | Falk-Jordan |
| 9,562,879 B2 | | 2/2017 | Hirmer et al. |
| 9,751,085 B2 | | 9/2017 | Pa |
| 9,764,323 B2 | | 9/2017 | Bunner et al. |
| 9,803,782 B2 | | 10/2017 | Dehmer |
| 9,804,134 B2 | | 10/2017 | Burger et al. |
| 9,950,278 B1 | | 4/2018 | Zelechonok |
| 9,982,820 B2 | | 5/2018 | Haeckel |
| 10,018,604 B2 | | 7/2018 | Burger et al. |
| 10,060,560 B2 | | 8/2018 | Belanger et al. |
| 10,067,102 B2 | | 9/2018 | Hochgraeber et al. |
| 2004/0239113 A1 | * | 12/2004 | Hefele ................. F16L 15/001 |
| | | | 285/333 |
| 2006/0060515 A1 | | 3/2006 | Benevides et al. |
| 2006/0113794 A1 | * | 6/2006 | Plant ................. G01N 30/6004 |
| | | | 285/339 |
| 2007/0029791 A1 | | 2/2007 | Haertl |
| 2007/0175809 A1 | | 8/2007 | Cao et al. |
| 2008/0237112 A1 | | 10/2008 | Ford et al. |
| 2009/0295156 A1 | | 12/2009 | Ford et al. |
| 2010/0224543 A1 | | 9/2010 | Ellis et al. |
| 2011/0298210 A1 | | 12/2011 | Hochgraeber et al. |
| 2011/0303593 A1 | | 12/2011 | Reinhardt |
| 2012/0061955 A1 | | 3/2012 | Hochgraeber |
| 2013/0043677 A1 | | 2/2013 | Gibson |
| 2014/0053639 A1 | | 2/2014 | DellaRovere et al. |
| 2014/0150923 A1 | | 6/2014 | Stalder et al. |
| 2015/0233503 A1 | | 8/2015 | Reinhardt et al. |
| 2015/0300542 A1 | * | 10/2015 | Graham ............. F16L 19/0206 |
| | | | 285/393 |
| 2015/0369403 A1 | | 12/2015 | Cormier et al. |
| 2016/0305586 A1 | | 10/2016 | Graham et al. |
| 2017/0122918 A1 | | 5/2017 | Wachinger et al. |
| 2017/0153212 A1 | | 6/2017 | Cormier et al. |
| 2017/0356575 A1 | | 12/2017 | Buerger et al. |
| 2018/0161697 A1 | | 6/2018 | Liu |
| 2019/0091693 A1 | | 3/2019 | Hirmer |
| 2019/0176054 A1 | | 6/2019 | Buerger |
| 2019/0186670 A1 | | 6/2019 | Jencks et al. |

FOREIGN PATENT DOCUMENTS

| | | |
|---|---|---|
| CN | 102439437 A | 5/2012 |
| CN | 102537563 A | 7/2012 |
| CN | 103026221 A | 4/2013 |
| CN | 103748396 A | 4/2014 |
| CN | 103807530 A | 5/2014 |
| CN | 103823002 A | 5/2014 |
| CN | 110036291 A | 7/2019 |
| DE | 9320084 U1 | 4/1995 |
| DE | 19755233 C1 | 4/1999 |
| DE | 102011082470 A1 | 3/2013 |
| DE | 102014101759 A1 | 8/2015 |
| EP | 3163298 A2 | 5/2017 |
| GB | 2184186 A | 6/1987 |
| GB | 2264543 A | 9/1993 |
| WO | 9423234 A1 | 10/1994 |
| WO | 9745666 A1 | 12/1997 |
| WO | 9936722 A1 | 7/1999 |
| WO | 0173338 A1 | 10/2001 |
| WO | 2009088663 A1 | 7/2009 |
| WO | 2010102225 A1 | 9/2010 |
| WO | 2010133192 A1 | 11/2010 |
| WO | 2011076244 A1 | 6/2011 |
| WO | 2012160033 A1 | 11/2012 |
| WO | 2013173843 A1 | 11/2013 |
| WO | 2013174421 A1 | 11/2013 |
| WO | 2014099777 A1 | 6/2014 |
| WO | 2016065334 A1 | 4/2016 |
| WO | 2017194193 A1 | 11/2017 |

OTHER PUBLICATIONS

International Search Report and Written Opinion in PCT/US2020/045940 dated Jan. 18, 2021.
International Preliminary Report on Patentability in International Patent Application No. PCT/US2020/023343 dated Sep. 30, 2021.
International Search Report and the Written Opinion in corresponding PCT Patent Application No. PCT/US2020/023343 dated Jul. 6, 2020. 17 pages.
Invitation to Pay Additional Fees and, Where Applicable, Protest Fee in related PCT Patent Application No. PCT/US2020/045940 dated Nov. 9, 2020. 15 pages.
Non-Final Office Action in U.S. Appl. No. 16/991,687 dated Nov. 18, 2022.
Restriction Requirement in U.S. Appl. No. 16/991,687 dated Jul. 8, 2022.
Non-Final Office Action in U.S. Appl. No. 16/991,687 dated Aug. 10, 2022.
Notice of Allowance in U.S. Appl. No. 16/991,687 dated Jun. 6, 2023.
Final Office Action in U.S. Appl. No. 16/991,687 dated Mar. 16, 2023.

* cited by examiner

REMOVABLE SEAL DEVICE FOR FLUIDIC COUPLING

RELATED APPLICATIONS

This application is a non-provisional patent application claiming priority to U.S. Provisional Patent Application No. 62/820,501, filed Mar. 19, 2019, entitled "Removable Seal Device for Fluidic Coupling," which is incorporated herein by reference.

FIELD OF THE INVENTION

The invention relates generally to chromatography. More particularly, the invention relates to fluidic couplings having a removable seal device for use in chromatography systems.

BACKGROUND

Chromatography is a set of techniques for separating a mixture into its constituents. Well-established separation technologies include HPLC (High Performance Liquid Chromatography), UPLC (Ultra Performance Liquid Chromatography) and SFC (Supercritical Fluid Chromatography). HPLC systems use high pressure, ranging traditionally between 1,000 psi (pounds per square inch) to approximately 6,000 psi, to generate the flow required for liquid chromatography (LC) in packed columns. Compared to HPLC, UPLC systems use columns with smaller particulate matter and higher pressures approaching 20,000 psi to deliver the mobile phase. SFC systems use highly compressible mobile phases, which typically employ carbon dioxide ($CO_2$) as a principle component.

In a typical LC system, a solvent delivery system takes in and delivers a mixture of liquid solvents to an injection system where an injected sample awaits the arrival of this mobile phase. The mobile phase carries the sample through a separating column. In the column, the mixture of the sample and mobile phase divides into bands depending upon the interaction of the mixture with the stationary phase in the column. A detector identifies and quantifies these bands as they exit the column.

Typical fluidic tube connections or couplings for LC systems employ fluidic tube that includes an integral or otherwise formed-on sealing component. When the sealing component of the fluidic tube, or a sealing surface thereof, fails or is damaged, the entire fluidic tube must be replaced. Often, the fluidic tube itself remains completely functional but must be wasted because the sealing component that has been integrally formed on its end is damaged. The lengths of fluidic tube in liquid chromatography systems wasted in this manner is significant.

Thus, a chromatography system that allows for a seal to be removed and replaced without removing, replacing or wasting the entire fluidic tube would be well received in the art.

SUMMARY

In one exemplary embodiment, a removable seal device for fluidic coupling includes a seal body extending between a first end and a second end, the seal body including an inner channel configured to receive a flow of a fluid, wherein the first end of the seal body includes a first sealing surface configured to create a first seal with a fitting sealing surface of a receiver fitting, and wherein the seal body includes a second sealing surface configured to create a second seal with an end of a fluidic tube, wherein the removable seal is configured to be removably secured to at least one of the fluidic tube, a support feature fixed to the fluidic tube, and a compression screw, such that untightening of the compression screw from the receiver fitting causes the removable seal device to be removed from the receiver fitting.

In addition or alternatively, the seal body includes a cylindrical portion extending from the first end, and a conical portion extending from the cylindrical portion and expanding in diameter as the conical portion extends from the cylindrical portion.

In addition or alternatively, the removable seal device further includes a metallic support sleeve surrounding the cylindrical portion configured to support the seal body.

In addition or alternatively, the cylindrical portion includes an internal bore dimensioned to receive the end of the fluidic tube and a length of the fluidic tube.

In addition or alternatively, the seal body further including an internal surface within at least one of the conical portion and a cylindrical extended portion of the conical portion, the internal surface including at least one feature configured to facilitate the removably securing to the at least one of the fluidic tube, the support feature fixed to the fluidic tube, and the compression screw.

In addition or alternatively, the at least one feature of the removable seal device includes threads configured to receive threads of the at least one of the fluidic tube, the support feature fixed to the fluidic tube, and the compression screw.

In addition or alternatively, the at least one feature includes a recess configured to receive a protruding feature of the at least one of the fluidic tube, the support feature fixed to the fluidic tube, and the compression screw.

In another exemplary embodiment, a fluidic coupling includes a fluidic tube including an end surface; a compression screw extending along an axis from a first end to a second end, the compression screw including an opening extending from the first end to the second end along the axis, wherein the fluidic tube is configured to extend through the opening; and a removable seal device for fluidic coupling including a seal body extending between a first end and a second end, the seal body including an inner channel configured to receive a flow of a fluid, wherein the first end of the seal body includes a first sealing surface configured to create a first seal with a fitting sealing surface of a receiver fitting, and wherein the seal body includes a second sealing surface configured to create a second seal with an end of a fluidic tube, wherein the removable seal is configured to be removably secured to at least one of the fluidic tube, a support feature fixed to the fluidic tube, and a compression screw, such that untightening of the compression screw from the receiver fitting causes the removable seal device to be removed from the receiver fitting.

In addition or alternatively, the seal body includes a cylindrical portion extending from the first end, and a conical portion extending from the cylindrical portion and expanding in diameter as the conical portion extends from the cylindrical portion.

In addition or alternatively, the fluidic coupling further includes a metallic support sleeve surrounding the cylindrical portion configured to support the seal body.

In addition or alternatively, the cylindrical portion includes an internal bore dimensioned to receive the end surface of the fluidic tube and a length of the fluidic tube.

In addition or alternatively, the seal body further including an internal surface within at least one of the conical portion and a cylindrical extended portion of the conical portion, the internal surface including at least one feature configured to facilitate the removably securing the removable seal device.

In addition or alternatively, the compression screw includes a main body configured to engage with the receiver fitting, the compression screw further including an extending portion extending from the main body to the first end, the extending portion including a smaller diameter than the main body, the extending portion including a radially protruding feature, and wherein the at least one feature includes a radial recess in the internal surface configured to receive the radially protruding feature of the compression screw.

In addition or alternatively, the support feature is fixed to the fluidic tube extending between a first end and a second end, the second end including a flat surface configured to abut the first end of the compression screw during tightening of the fluidic coupling, the internal surface of the seal body dimensioned to receive the support feature.

In addition or alternatively, the compression screw includes a main body configured to engage with the receiver fitting, the compression screw further including an extending portion extending from the main body to the first end, the extending portion including a smaller diameter than the main body, the extending portion including a threaded portion, and wherein the at least one feature includes threads configured to the threaded portion of the compression screw.

In addition or alternatively, the fluidic tube includes the support feature fixed to the fluidic tube proximate the end surface, the support feature having a greater diameter than the fluidic tube, the support feature configured to abut the first end of the compression screw, the support feature including a threaded portion, and wherein the at least one feature includes threads configured to engage the threaded portion of the device.

In another exemplary embodiment, a method of fluidic coupling includes: providing a fluidic tube including an end surface; providing a compression screw; providing a removable seal device including a seal body extending between a first end and a second end, the removable seal device including an inner channel, wherein the first end of the removable seal device includes a first sealing surface, and wherein the removable seal device includes a second sealing surface; providing a receiver fitting; removably attaching the removable seal device to the compression screw; tightening the compression screw to the receiver fitting; creating a first seal between the first sealing surface and a fitting sealing surface of the receiver fitting; and creating a second seal between the second sealing surface and the end surface of a fluidic tube.

In addition or alternatively, the method includes receiving fluid from the fluidic tube by the fluidic channel; and providing the received fluid from the fluidic channel to a channel of the receiver fitting.

In addition or alternatively, the method includes loosening the compression screw from the receiver fitting; simultaneously removing the compression screw, the fluidic tube and the removable seal device from the receiver fitting; and unattaching the removable seal device from the compression screw after the simultaneously removing.

In addition or alternatively, the method includes providing a second removable seal device having a seal body extending between a first end and a second end, the second removable seal device including an inner channel, wherein the first end of the second removable seal device includes a first sealing surface, and wherein the second removable seal device includes a second sealing surface; removably attaching the second removable seal device to the compression screw; tightening the compression screw to the receiver fitting after the removably attaching the second removable seal device to the compression screw; creating a first seal between the first sealing surface of the second removable seal device and the fitting sealing surface of the receiver fitting; and creating a second seal between the second sealing surface of the second removable seal device and the end surface of a fluidic tube.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
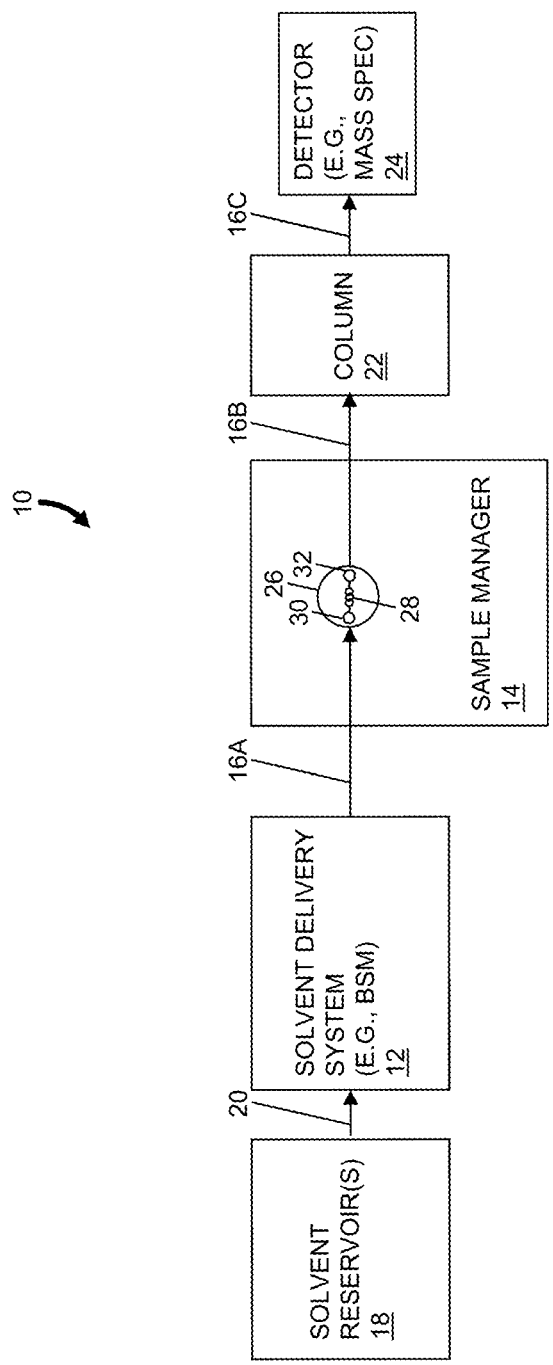
FIG. 1 depicts a block diagram of an embodiment of a liquid chromatography system.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

High pressure fittings used in chromatographic systems typically include a compression member (e.g., a ferrule) and a compression screw to couple a fluid path in a tube to a fluid channel in a structure that includes a receiving port to receive the fitting. Hereinafter a "compression screw" may be a compression nut, or other feature configured to engage with a receiver fitting and compress or push on a fluidic tube into the receiver fitting. During installation, the installer slides the compression screw onto the tube and then slides the ferrule onto the tube before inserting the tube into the receiving port. The compression screw is tightened while the installer maintains a force on the tube to keep the endface of the tube in contact with a sealing surface at the bottom of the receiving port. The installer needs to know the proper installation technique. If installed improperly, or as a result of wear over time, damage can occur at the endface of the tube that is in contact with the sealing surface at the bottom of the receiving port. If damage is incurred, the entirety of the tube would need to be replaced because prior art seals are integrally connected to the end of the tube.

In brief overview, the invention relates to a removable seal device for fluidic coupling that is not integrally connected to an end of the tube. In the embodiments described, a removable seal device may be removably attached to the end of the tube in a manner that allows for the seal device to become unattached, removed, or decoupled from the end of the tube after use. Embodiments of the invention include removably attaching the removable seal device to the end of the tube in a manner that maintains its attachment when the fluidic coupling is being removed from the receiver fitting. Thus, the removable seal includes structure configured to attach to at least one of the tube, a support feature that is affixed to the tube, a compression screw, or any other portion of the fluidic coupling. In embodiments described herein, the removable seal is configured to maintain this attachment when the fluidic coupling is removed from the receiver fitting. In embodiments described herein, the tube, compression screw, and other non-seal components of the fluidic coupling may be made of more durable materials than the removable seal. Thus, embodiments contemplate replacement of the removable seal device after wear and tear, without replacing the entire length of tube and other components of the fluidic coupling. The invention described herein may be applicable to creating fluidic tube connections or couplings on various liquid chromatography systems, at various locations within those systems. The figures and accompanying description describe individual embodiments exemplifying the features of the invention.

FIG. 1 shows an embodiment of a liquid chromatography system 10 for separating a sample into its constituents. The liquid chromatography system 10 can be an HPLC, UPLC, or SFC system. The liquid chromatography system 10 includes a solvent delivery system 12 in fluidic communication with a sample manager 14 (also called an injector or autosampler) through fluidic tube 16A. The solvent delivery system 12 includes pumps (not shown) in fluidic communication with solvent (or fluid) reservoirs 18 from which the pumps draw solvents through a fluidic conduit 20, which may be a fluidic conduit, line, tube or channel. A chromatography column 22 is in fluidic communication with the sample manager 14 through fluidic tube 16B. Fluidic tube 16C couples the output of the column 22 to a detector 24, for example, a mass spectrometer, a UV detector, or any other detector. Through the fluidic tube 16C, the detector 24 receives the separated components from the column 22 and produces an output from which the identity and quantity of the analytes may be determined. As described herein, at various locations in the liquid chromatography system 10, the fluidic tubes 16A, 16B, 16C are coupled to system components using high pressure fittings. Each fluidic tube 16 refers to a section of tubing rather a single tube. Each tubing section may comprise one tube or multiple tubes joined in series (e.g., by valves, tees, etc).

The sample manager 14 includes an injector valve 26 with a sample loop 28. The solvent manager 14 operates in one of two states: a load state and an injection state. In the load state, the position of the injector valve 26 is such that the solvent manager 14 loads the sample into the sample loop 28; in the injection state, the position of the injector valve 26 changes so that solvent manager 14 introduces the sample in the sample loop 28 into the continuously flowing mobile phase arriving from the solvent delivery system 12. With the injector valve 26 in the injection state, the mobile phase carries the sample into the column 22. To accomplish this, the mobile phase arrives at the injector valve 26 through an input port 30 and leaves the injector valve with the sample through an output port 32.

Various fittings according to principles of the invention as described below may be present within the liquid chromatography system 10. For example, such fittings may be present where the fluidic tube 16A connects to the input port 30 of the injector valve 26, where the fluidic tube 16B connects to the output port 32 of the injector valve 26 and to the column 22, and where the fluidic tube 16C connects to the output end of the column 22 and to the detector 24.

Figure 2:
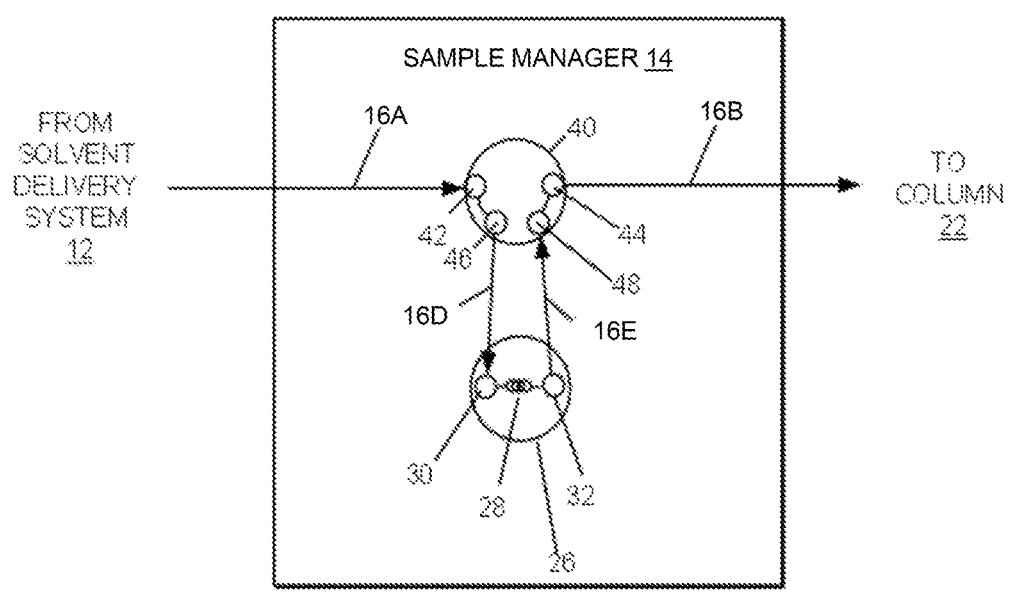
FIG. 2 depicts a functional diagram of an embodiment of a sample manager of a liquid chromatography system.

As shown in FIG. 2, in some embodiments, for example, those in which the liquid chromatography system 10 is a $CO_2$-based system, the sample manager 14 can further include an auxiliary valve 40 interposed between the solvent delivery system 12 and the injector valve 26 and between the injector valve 26 and the column 22. In general, the auxiliary valve 40 provides a fluidic pathway through which the injector valve 26 may vent. In this embodiment, the fluidic tube 16A couples the solvent delivery system 12 to a first input port 42 of the auxiliary valve 40 and the fluidic tube 16B couples a second output port 44 of the auxiliary valve 40 to the column 22. Fluidic tube 16D and 16E also couple the auxiliary valve 40 to the injector valve 26; fluidic tube 16D connects a first output port 46 of the auxiliary valve 40 to the input port 30 of the injector valve 26, and fluidic tube 16E connects the output port 32 of the injector valve 26 to a second input port 48 of the auxiliary valve 40.

When the valves 26, 40 are configured for sample injection, the arrows on the fluidic tube 16A and 16D show the direction of flow of the mobile phase towards the injector valve 26; those arrows on the fluidic tube 16E and 16B correspond to the flow of the mobile phase carrying the sample from the injector valve 26 towards the column 22.

Like the fluidic tube 16A, 16B, 16C described in connection with FIG. 1, the additional fluidic tube 16D and 16E can also be coupled at their ends with fittings configured according to principles of the invention. More specifically, such fittings may be present where the fluidic tube 16D connects to the first output port 46 of the auxiliary valve 40 and to the input port 30 of the injector valve 26, and where the fluidic tube 16E connects to the output port 32 of the injector valve 26 and to the second input port 48 of the auxiliary valve 40.

Figure 3:
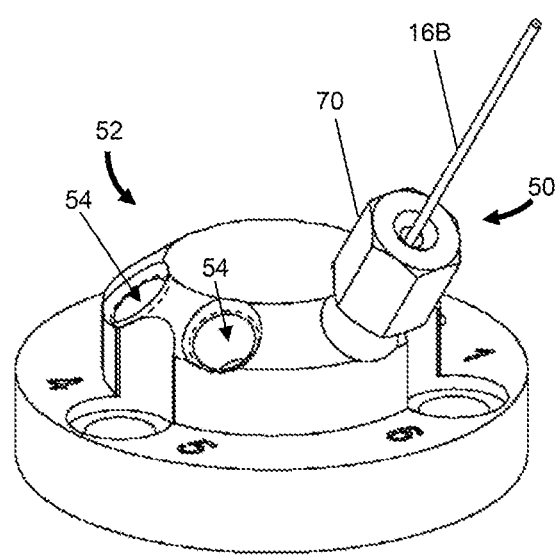
FIG. 3 depicts an illustration of an embodiment of a fluidic coupling of tubing to a stator portion of a rotary shear seal valve through a fitting.

FIG. 3 shows an example of how a fluidic coupling 50 is used to couple the fluidic tube 16B to the stator portion 52 of a rotary shear seal valve through one of the receiving ports 54. Only one fitting connection is shown for clarity although it will be recognized that other fluidic tube 16B may be coupled to other receiving ports 54 of the stator portion 52 in a similar manner. The fluidic tube 16B is shown extending into a compression screw 70. The compression screw 70 may also be described as a compression nut. While the fluidic tube 16B is shown for exemplary purposes in FIG. 3, it should be understood that embodiments of the invention may be incorporated to connect any of the fluidic tubes 16A, 16B, 16C, 16D, 16E (generally 16) and receivers of the liquid chromatography system 10 or any other fluidic system having fluidic fittings.

Figure 4:
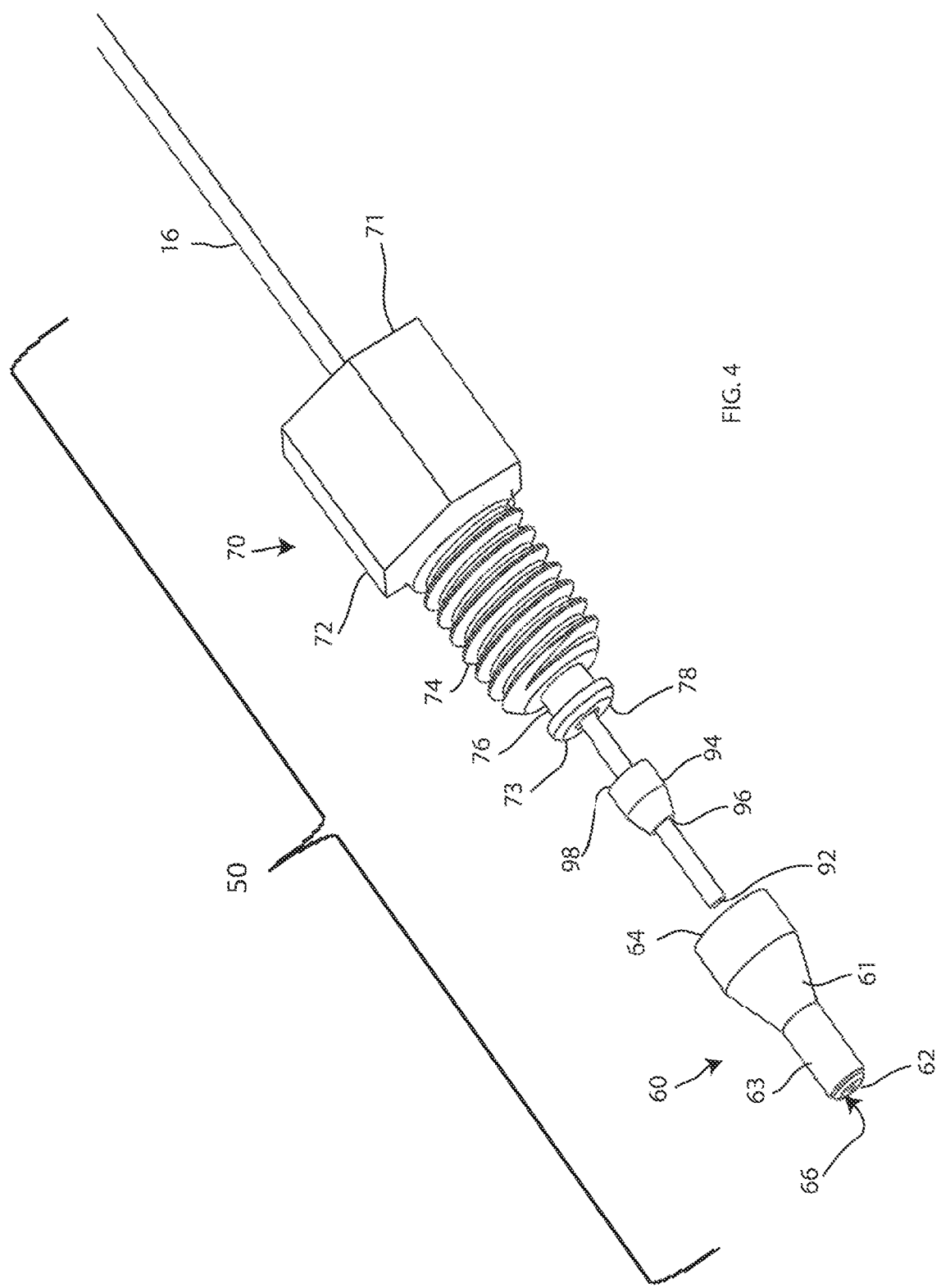
FIG. 4 depicts a partially exploded view of an exemplary one of the fluidic couplings of FIG. 1-3 including a removable seal device.
Figure 5:
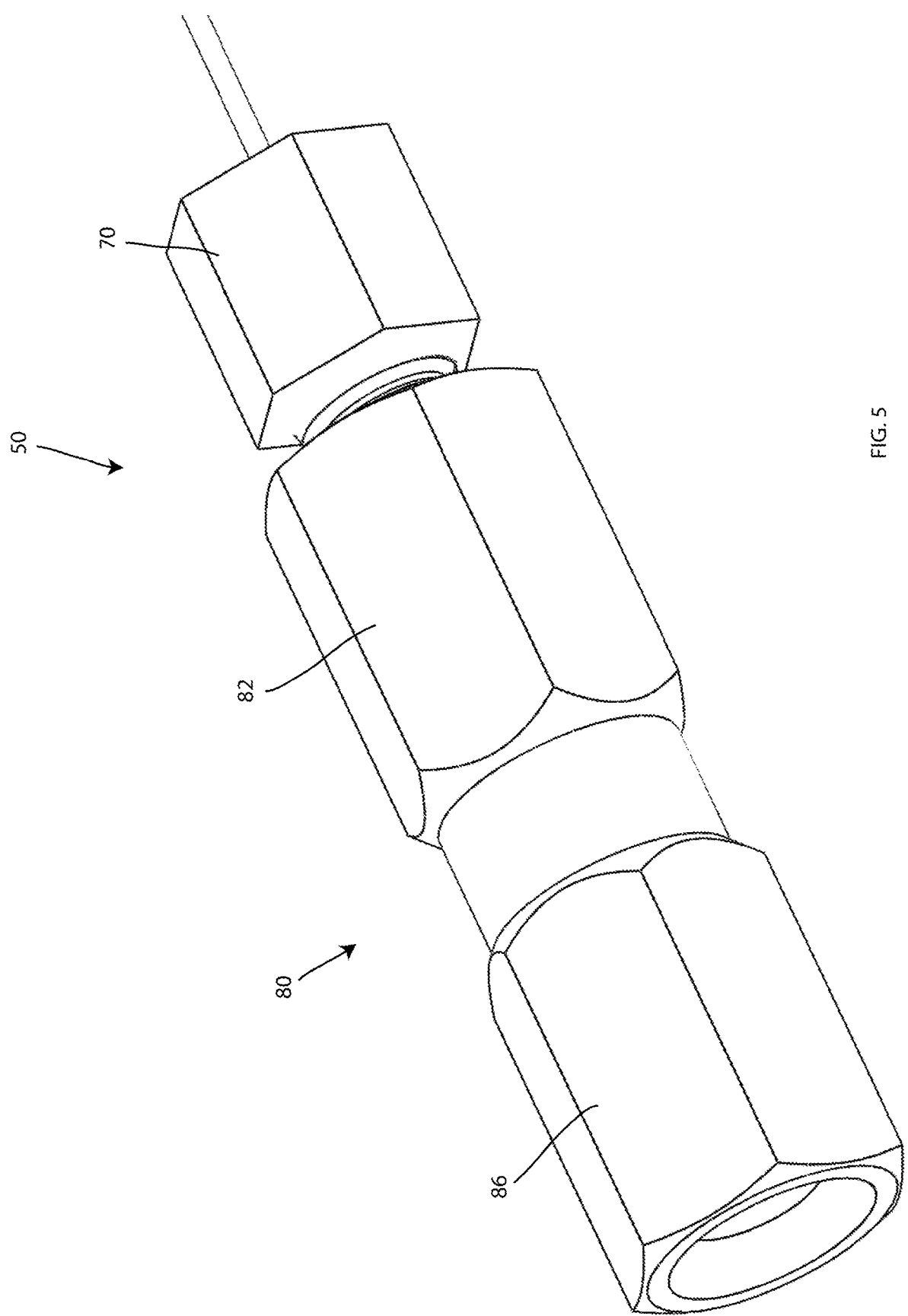
FIG. 5 depicts a perspective view of the fluidic coupling of FIG. 4 attached to a receiver fitting.
Figure 6:
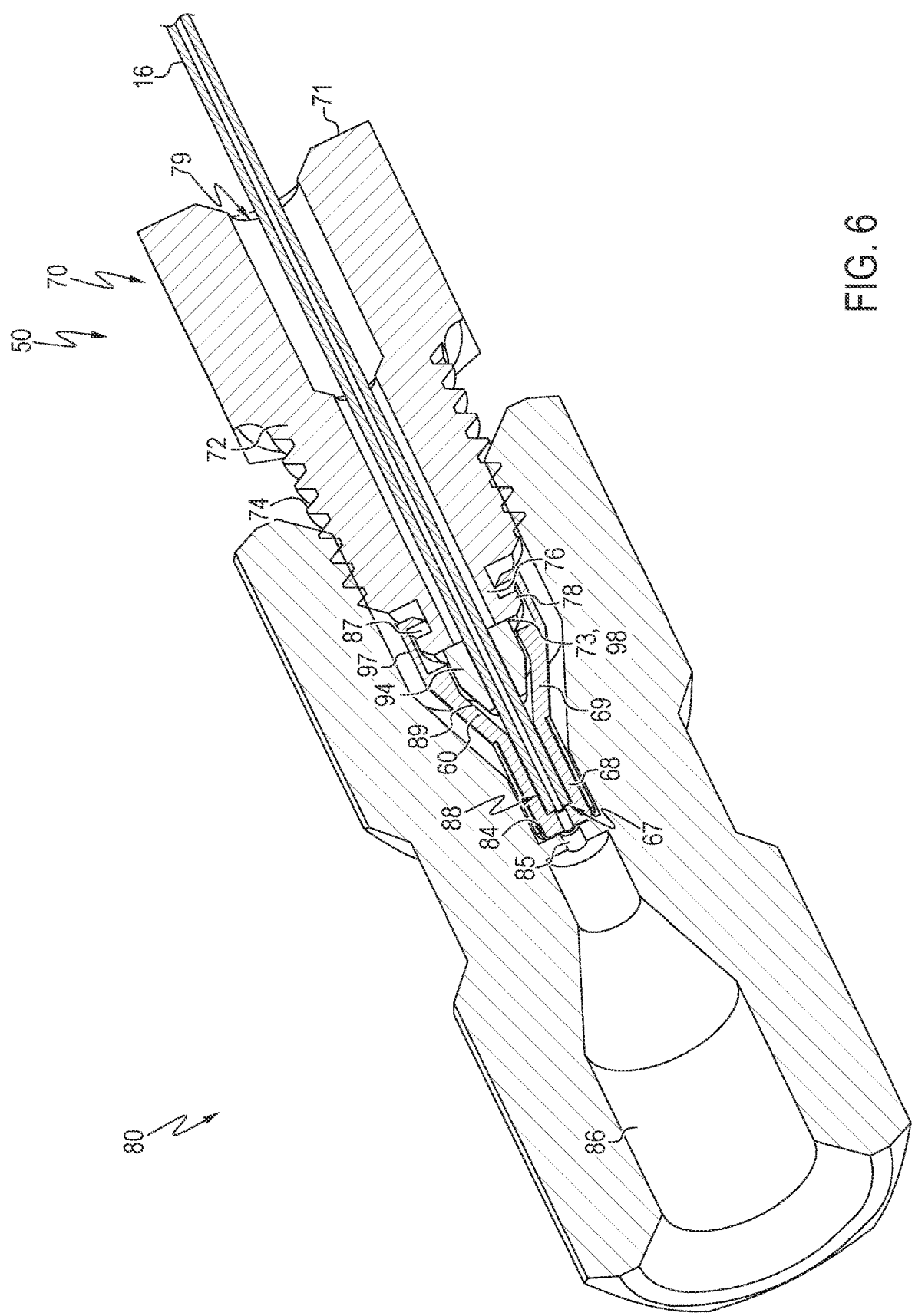
FIG. 6 depicts a side cross sectional view of the fluidic coupling of FIGS. 4 and 5 attached to the receiver fitting of FIG. 5.

FIGS. 4-6 depict various views of an exemplary one of the fluidic couplings 50 of FIGS. 1-3. In particular, FIG. 4 depicts a partially exploded view of an exemplary one of the fluidic couplings 50 of FIG. 1-3 including a removable seal device 60. FIG. 5 depicts a perspective view of the fluidic coupling 50 of FIG. 4 attached to a receiver fitting 80. FIG. 6 depicts a side cross sectional view of the fluidic coupling 50 of FIGS. 4 and 5 attached to the receiver fitting 80.

As shown in FIG. 4, the fluidic coupling 50 includes a fluidic tube 16 having a support feature 94, a compression screw 70 and the removable seal device 60. The fluidic tube 16 is shown inserted into the compression screw 70 such that the compression screw 70 is rotatable about the fluidic tube 16. The removable seal device 60 extends between a first end 62 and a second end 64. The second end 64 of the removable seal device 60 may include an opening that is configured to receive a first end 92 of the fluidic tube 16 (shown in FIG. 6). The removable seal device 60 is configured to form a first seal between a first end 62 of the removable seal device 60 and a fitting sealing surface of a receiver fitting, while also being configured to create a second seal between an internal cavity of the removable seal device 60 and the first end 92 of the fluidic tube 16 (shown in more detail in FIG. 6).

As shown in FIG. 4, the removable seal device 60 is not integrally connected to the first end 92 of the fluidic tube 16. Rather, the removable seal device 60 is removably attached to the first end 92 of the fluidic tube 16 in a manner that allows for the removable seal device 60 to become unattached, removed, or decoupled from the first end 92 of the fluidic tube 16 after use. However, the removable seal device 60 may be configured to be removed from a receiver fitting while maintaining attachment to the first end 92 of the fluidic tube 16 in a manner that maintains its attachment when the fluidic coupling 50 is being removed from a receiver fitting. Thus, the removable seal device 60 includes structure, described below, that is configured to removably attach to the compression screw 70. In embodiments described herein, the removable seal device 60 is configured to maintain this attachment as the fluidic coupling 50 is being removed from a receiver fitting.

The fluidic tube 16 may be made of a plastic, glass or metal material, such as stainless steel, titanium, nitronic 60 and Hastelloy. The support feature 94 may further be made of a durable material. For example, the support feature 94 may also be made of metal, such as stainless steel, titanium, nitronic 60 and Hastelloy. Likewise, the compression screw 70 may be made of a metallic material, such as stainless steel, titanium, nitronic 60 and Hastelloy. In one embodiment, the compression screw 70 and the support feature 94 may be made from different materials than each other. This may minimize the risk of material damage between the two components 70, 94. Unlike the fluidic tube 16, the support feature 94 and the compression screw 70, the removable seal device 60 may be made of a compliant or flexible material. For example, the removable seal 60 may be a polymer material such as polyether ether ketone (PEEK), or the like. The removable nature of the removable seal device 60 allows an operator to replace the seal after it is damaged due to natural use or an improper installation. The removable nature of the removable seal device 60 also allows replacement of the removable seal device 60 without requiring replacement of the entire length of the fluidic tube 16.

As shown in FIG. 4, the compression screw 70 extends along an axis from a first end 71 to a second end 73. The compression screw 70 includes a main body 72 that includes a threaded portion 74. The threaded portion 74 may be configured to engage with threads of a receiver fitting to attach the fluidic coupling 50 thereto. The compression screw 70 further includes an extending portion 76 extending from the main body 72. The extending portion 76 extends along the axis of the compression screw 70 from the main body 72 and includes a smaller diameter than the threaded portion 74 of the main body 72. Proximate the second end 73 of the compression screw 70, the extending portion 76 includes a radially protruding feature 78, which may be a lip, a shelf, an overhang, a projection, a flange, a rim, a collar, or any other protrusion. The second end 73 of the compression screw 70 may include a flat surface that is configured to abut the support feature 94 when the fluidic coupling 50 is attached to a receiver fitting.

The fluidic coupling 50 includes a support feature 94 that is fixed proximate the first end 92 of the fluidic tube 16. The support feature 94 extends between a first end 96 and a second end 98. The support feature 94 includes a conical portion proximate the first end 96 that enlarges in diameter as the conical portion extends away from the first end 92 of the fluidic tube 16. The support feature 94 includes a cylindrical portion that extends from the conical portion. The support feature 94 may be an integral component of the fluidic tube 16, or may alternatively be permanently attached to the fluidic tube, such as by welding, an epoxy or adhesive, or the like. Thus, the support feature 94 may be affixed in manner that permanently maintains its position along the axis of the fluidic tube 16. The support feature 94 may include a materially solid structure having an opening, bore or channel extending axially along its length that is dimensioned to receive the fluidic tube 16.

The removable seal device 60 includes a seal body 61. The seal body 61 extends from the first end 62 with a cylindrical region. A metallic support sleeve 63 surrounds the cylindrical region. The main body 61 further includes a conical portion that extends from the cylindrical region. A larger diameter cylindrical region extends from the conical portion to the second end 64 of the removable seal device 60. The interior dimensions of the removable seal device 60 are shown in FIG. 6 and will be described herein below.

Referring now to FIG. 5, the fluidic coupling 50 is shown connected to a receiver fitting 80. In the embodiment shown, the receiver fitting 80 is a union-type fitting having two receivers, each for receiving a fluidic coupling and fluidic tube. In the embodiment shown, the fluidic coupling 50 is attached to a first receiver body 82 of the receiver fitting 80. The receiver fitting 80 further includes a second receiver body 86 that is shown without being connected to any fluidic coupling or fluidic tube. The receiver fitting 80 is shown for exemplary purposes, and the fluidic coupling 50 and/or the principles described herein and embodied by the fluidic coupling 50, may be utilized with any appropriate receiver fitting within any chromatography system, such as liquid chromatography, high performance liquid chromatography, UPLC®, gas chromatography, supercritical fluid chromatography, or the like. For example, exemplary receiver fittings may include standard metal ferrule and compression screws, PEEK ferrule and compression screws, and other manufacturer's finger tight fittings, such as Waters Zen Fit®, and the like.

FIG. 6 shows a cutaway view of the fluidic coupling 50 attached to the receiver fitting 80. As shown, the compression screw 70 of the fluidic coupling includes an opening 79 that extends the axial length of the compression screw 70 within which the fluidic tube 16 resides. The fluidic tube 16 is thereby configured to extend through the opening 79 and extend out from each of the first end 71 and the second end 73 of the compression screw 70.

As shown, the first end 92 of the fluidic tube 16 is located within an opening of the removable seal device 60. Specifically, the seal body 61 of the removable seal device 60 includes a cylindrical portion 68 extending from the first end 62 which is dimensioned to closely surround the fluidic tube 16. For example, the cylindrical portion 68 may include an internal bore or other opening that is dimensioned to receive the first end 92 of the fluidic tube 16 and an axial length of the fluidic tube 16. In one embodiment, the internal bore may create an interference fit with the fluidic tube 16. The metallic support sleeve 63 (shown more clearly in FIG. 4) surrounds the cylindrical portion 68 of the removable seal device 60 and may be configured to maintain the structural integrity of the thin cylindrical portion 68 during tightening of the compression screw 70. A conical portion 69 of the removable seal device 60 is shown extending from the cylindrical portion 68 and expanding in diameter as the conical portion 69 extends away from the cylindrical portion 68. Extending from the conical portion 69 is another cylindrical portion 97 that acts as the outer structure for the radial recess 87.

Prior to connecting the fluidic coupling 50 to the receiver fitting 80 as shown in FIG. 6, first the compression screw 70 may be slid axially along the fluidic tube 16 until the second end 73 of the compression screw 70 abuts the second end 98 of the support feature 94. Once the compression screw 70 is in position, the first end 92 of the fluidic tube 16 may be inserted into an inner bore 88 of the removable seal device 60 until the first end 92 of the fluidic tube 16 is proximate a second sealing surface 67 of the removable seal device 60. Pushing the first end 92 of the fluidic tube 16 into the inner bore 88 simultaneously brings a radial recess 87 located on an internal surface 89 within the opening of the removable seal device 60 proximate the radially protruding feature 78 of the compression screw 70. The removable seal device 60 is made of a flexible or compliant material such that the radially protruding feature 78 may temporarily expand the opening at the second end 64 of the removable seal device 60 in order to receive the radially protruding feature 78 within the radial recess 87. Once the radially protruding feature 78 is attached in this way to removable seal device 60 by being inserted into and located within the radial recess 87, the removable seal device 60 may be connected to the compression screw 70 so that even when the compression screw 70 is removed or otherwise disconnected from the receiver fitting 80 after use, the removable seal device 60 is configured to remain attached. However, intentionally pulling the removable seal device 60 from the radially protruding portion 78 of the compression screw 70 is configured to allow its removal therefrom. Thus, the radial recess 87 of the internal surface 89 of the opening of the removable seal device 60 may be configured to facilitate removable attachment or securing of the removable seal device 60 to the second end 73 of the compression screw 70.

Once the removable seal device 60 is attached to the compression screw 70 in the removably attached manner described above, the fluidic coupling 50 may then be connected to a receiver fitting, such as the receiver fitting 80 as shown in FIG. 6. To accomplish connecting the fluidic coupling 50 within the receiver fitting 80, the threads 74 of the compression screw 70 are configured to engage with internal threads of the opening of the receiver fitting 80. As the compression screw 70 is turned within the receiver fitting 80 and moves axially into the opening of the receiver fitting 80, the second end 73 of the compression screw 70 pushes the second end 98 of the support feature 94, thereby pushing the attached fluidic tube 16. The support feature 94 and the internal surface 89 of the removable seal device 60 are each dimensioned so that the conical portion of the support feature 94 is located within the conical portion 69 of the internal surface 89 of the removable seal device 60. The support feature 94 may be under pressure with the internal surface 89 of the removable seal device 60 after tightening of the compression screw 70.

After being tightened by the compressions crew 70, the first sealing surface 66 of the removable seal device 60 is configured to create a first seal with a fitting sealing surface 84 of the receiver fitting 80 as shown in FIG. 6. Further, the second sealing surface 67 of the removable seal device 60 is configured to create a second seal with the first end 92 of a fluidic tube 16 as the first end 92 of the fluidic tube 16 is pushed forward by the compression screw 70 moving the support feature 94.

Once connected, fluid may be received through the fluidic tube 16. The seal body 61 of the removable sealing device 60 includes an inner channel 65 or opening configured to receive a flow of fluid therethrough from the first end 92 of the fluidic tube 16. The fluid may then flow through a channel 85 of the receiver fitting 80 and eventually into a second fluidic coupling (not shown) that is attached to the second receiver body 86. For other types of receiver fittings, it should be understood that the fluidic coupling 50 may operate and connect in the same manner as described hereinabove with respect to the operation and connection with the receiver fitting 80.

Figure 7:
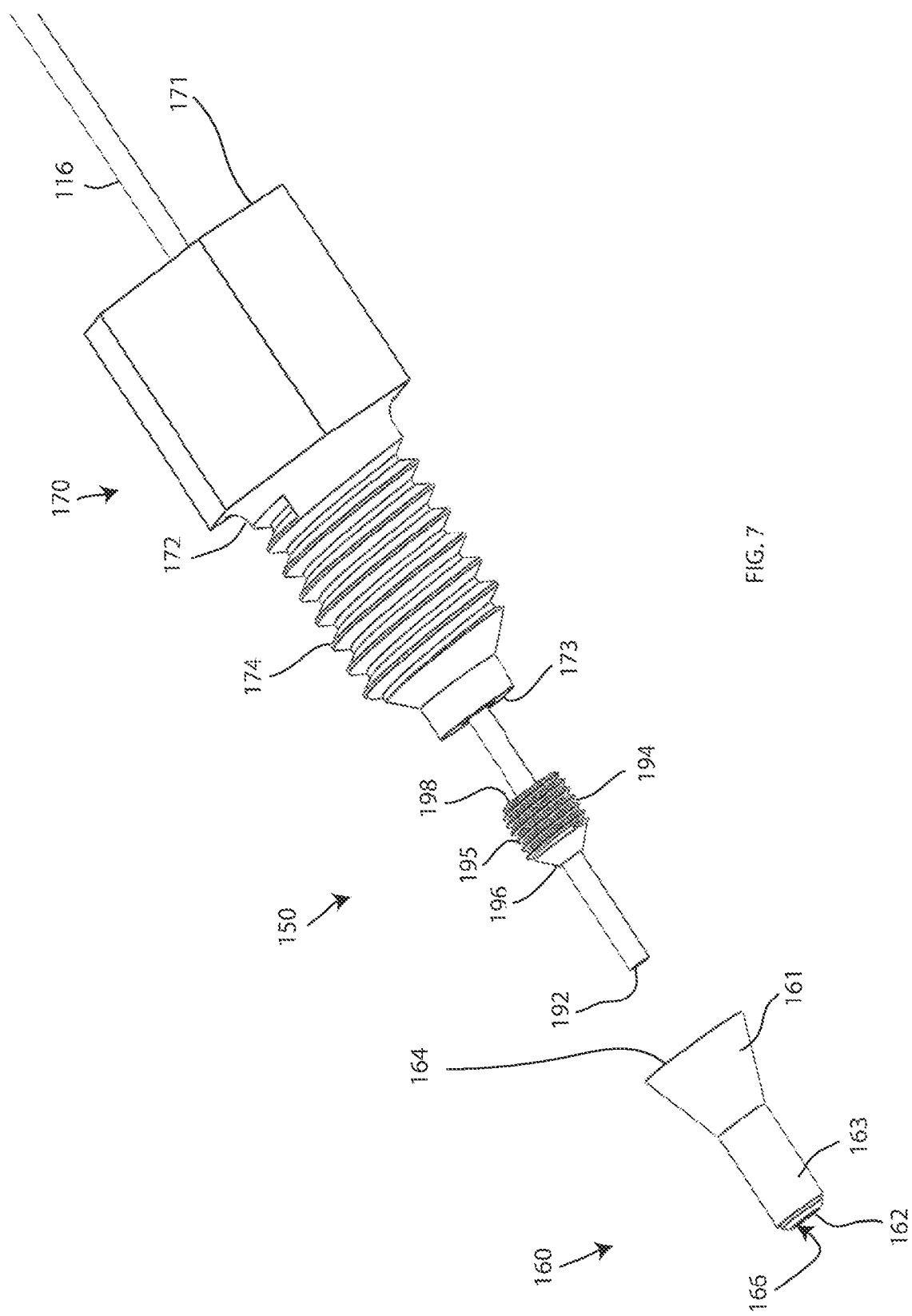
FIG. 7 depicts a partially exploded view of another embodiment of a fluidic coupling including a removable seal device.
Figure 8:
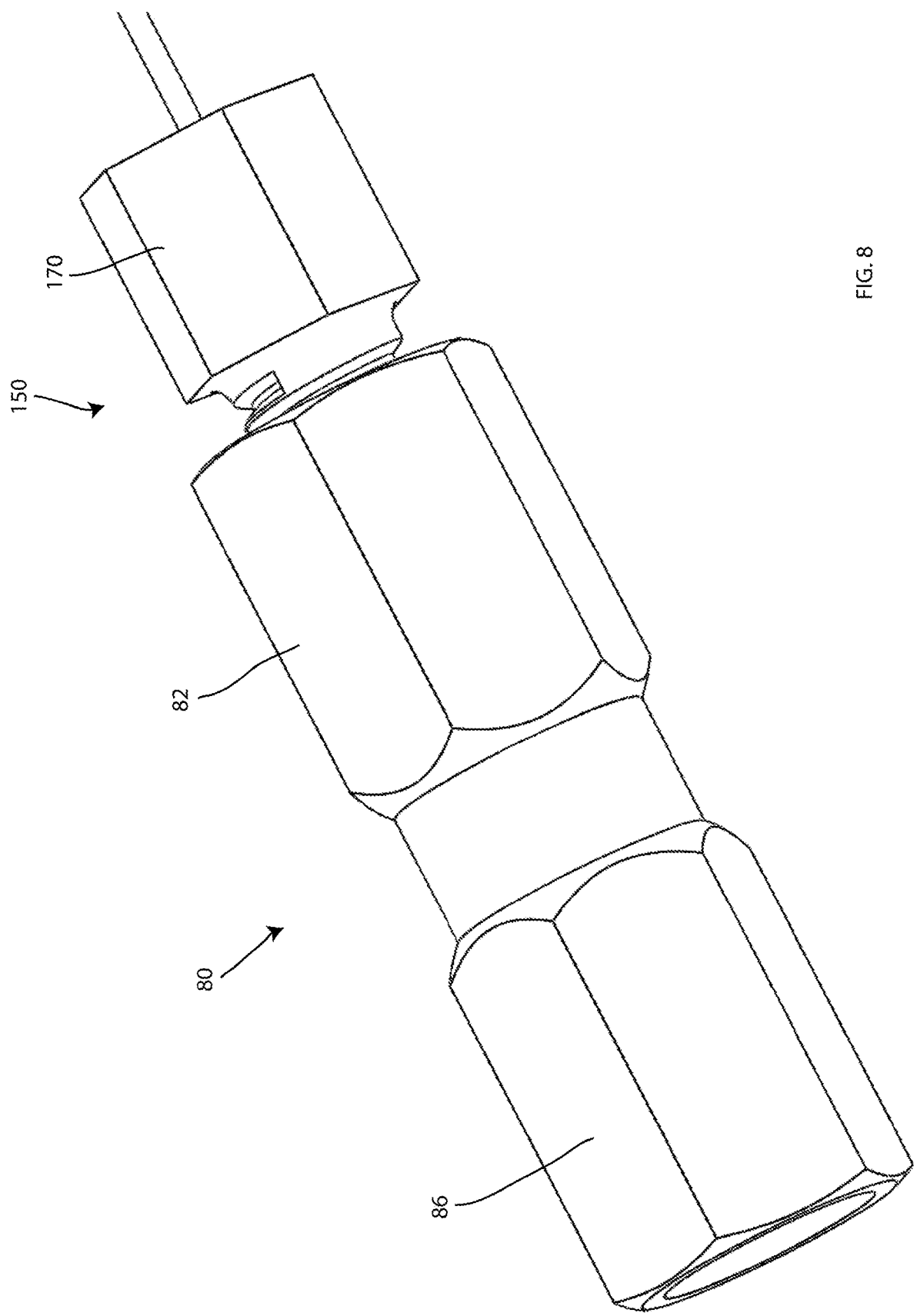
FIG. 8 depicts a perspective view of the fluidic coupling of FIG. 7 attached to a receiver fitting.
Figure 9:
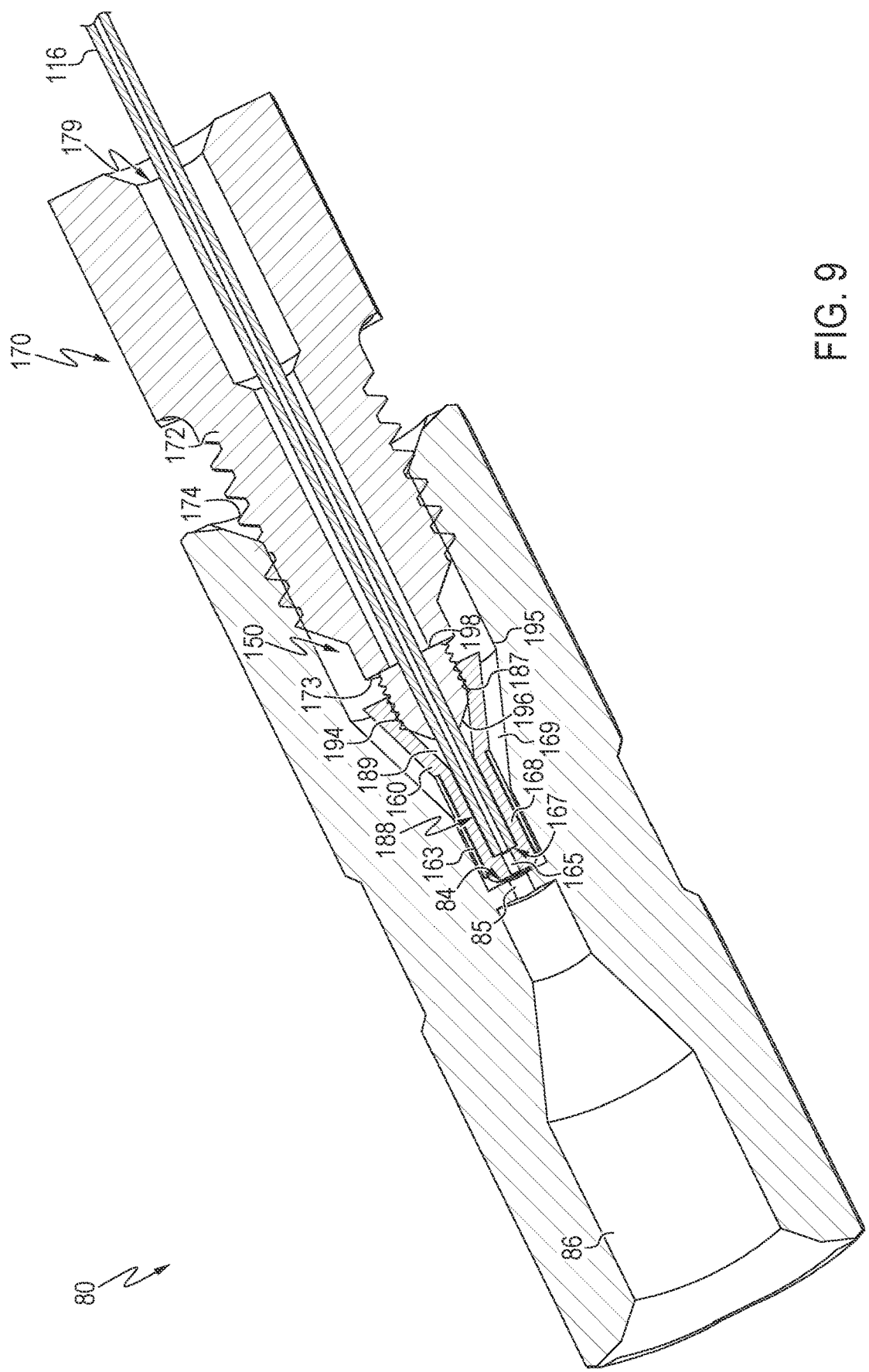
FIG. 9 depicts a side cross sectional view of the fluidic coupling of FIGS. 7 and 8 attached to the receiver fitting of FIG. 8.

FIGS. 7-9 depict various views of an exemplary another fluidic coupling 150 that may be incorporated into the liquid chromatography system 10, sample manager 14 or the stator portion 52 of a rotary shear seal valve of FIGS. 1-3. In particular, FIG. 7 depicts a partially exploded view of the fluidic coupling 150 including a removable seal device 160. FIG. 8 depicts a perspective view of the fluidic coupling 150 of FIG. 4 attached to the receiver fitting 80. FIG. 9 depicts a side cross sectional view of the fluidic coupling 150 of FIGS. 7 and 8 attached to the receiver fitting 80.

As shown in FIG. 7, the fluidic coupling 150 includes a fluidic tube 116 having a support feature 194, a compression screw 170 and the removable seal device 160. The fluidic tube 116 is shown inserted into the compression screw 170 such that the compression screw 170 is rotatable about the fluidic tube 116. The removable seal device 160 extends between a first end 162 and a second end 164. The second end 164 of the removable seal device 160 may include an opening that is configured to receive a first end 192 of the fluidic tube 116 (shown in FIG. 9). The removable seal device 160 is configured to form a first seal between a first end 162 of the removable seal device 160 and a fitting sealing surface of a receiver fitting, while also being configured to create a second seal between an internal cavity of the removable seal device 160 and the first end 192 of the fluidic tube 116 (shown in more detail in FIG. 6).

As shown in FIG. 7, the removable seal device 160 is not integrally connected to the first end 192 of the fluidic tube 116. Rather, the removable seal device 160 is removably attached to the first end 192 of the fluidic tube 116 in a manner that allows for the removable seal device 160 to become unattached, removed, or decoupled from the first end 192 of the fluidic tube 116 after use. However, the removable seal device 160 may be configured to be removed from a receiver fitting while maintaining attachment to the first end 192 of the fluidic tube 116 in a manner that maintains its attachment when the fluidic coupling 150 is being removed from a receiver fitting. Thus, the removable seal device 160 includes structure, described below, that is configured to removably attach to the compression screw 170. In embodiments described herein, the removable seal device 160 is configured to maintain this attachment as the fluidic coupling 50 is being removed from a receiver fitting.

Like the fluidic tube 16, the fluidic tube 116 may be made of a plastic, glass or metal material, such as stainless steel, titanium, nitronic 60 and Hastelloy. The support feature 194 may further be made of a durable material. For example, the support feature 194 may also be made of metal, such as stainless steel, titanium, nitronic 60 and Hastelloy. Likewise, the compression screw 170 may be made of a metallic material, such as stainless steel, titanium, nitronic 60 and Hastelloy. In one embodiment, the compression screw 160 and the support feature 194 may be made from different materials than each other. This may minimize the risk of material damage between the two components 170, 194. Unlike the fluidic tube 116, the support feature 194 and the compression screw 170, the removable seal device 160 may be made of a compliant or flexible material. For example, the removable seal 160 may be a polymer material such as polyether ether ketone (PEEK), or the like. The removable nature of the removable seal device 160 allows an operator to replace the seal after it is damaged due to natural use or an improper installation. The removable nature of the removable seal device 160 also allows replacement of the removable seal device 160 without requiring replacement of the entire length of the fluidic tube 116.

As shown in FIG. 7, the compression screw 170 extends along an axis from a first end 171 to a second end 173. The compression screw 170 includes a main body 172 that includes a threaded portion 174. The threaded portion 174 may be configured to engage with threads of a receiver fitting to attach the fluidic coupling 150 thereto. The second end 173 of the compression screw 170 may include a flat surface that is configured to abut the support feature 194 when the fluidic coupling 150 is attached to a receiver fitting.

The fluidic coupling 150 includes a support feature 194 that is fixed proximate the first end 192 of the fluidic tube 116. The support feature 194 extends between a first end 196 and a second end 198. The support feature 194 includes a conical portion proximate the first end 196 that enlarges in diameter as the conical portion extends away from the first end 192 of the fluidic tube 116. The support feature 194 includes a threaded cylindrical portion 195 that extends from the conical portion. The support feature 194 may be an integral component of the fluidic tube 116, or may alternatively be permanently attached to the fluidic tube, such as by welding, an epoxy or adhesive, or the like. Thus, the support feature 194 may be affixed in manner that permanently maintains its position along the axis of the fluidic tube 116. The support feature 194 may include a materially solid structure having an opening, bore or channel extending axially along its length that is dimensioned to receive the fluidic tube 116.

The removable seal device 160 includes a seal body 161. The seal body 161 extends from the first end 162 with a cylindrical region. A metallic support sleeve 163 surrounds the cylindrical region. The main body 161 further includes a conical portion that extends from the cylindrical region. The interior dimensions of the removable seal device 160 are shown in FIG. 6 and will be described herein below.

Referring now to FIG. 8, the fluidic coupling 150 is shown connected to the receiver fitting 80. The receiver fitting 80 is shown for exemplary purposes. Like the fluidic coupling 50, the fluidic coupling 150 and/or the principles described herein and embodied by the fluidic coupling 150, may be utilized with any appropriate receiver fitting within any chromatography system.

FIG. 9 shows a cutaway view of the fluidic coupling 150 attached to the receiver fitting 80. As shown, the compression screw 170 of the fluidic coupling includes an opening 179 that extends the axial length of the compression screw 170 within which the fluidic tube 116 resides. The fluidic tube 116 is thereby configured to extend through the opening 179 and extend out from each of the first end 171 and the second end 173 of the compressions crew 170.

As shown, the first end 192 of the fluidic tube 116 is located within an opening of the removable seal device 160. Specifically, the seal body 161 of the removable seal device 160 includes a cylindrical portion 168 extending from the first end 162 which is dimensioned to closely surround the fluidic tube 116. For example, the cylindrical portion 168 may include an internal bore or other opening that is dimensioned to receive the first end 192 of the fluidic tube 116 and an axial length of the fluidic tube 116. In one embodiment, the internal bore may create an interference fit with the fluidic tube 116. The metallic support sleeve 163 (shown more clearly in FIG. 7) surrounds the cylindrical portion 168 of the removable seal device 160 and may be configured to maintain the structural integrity of the thin cylindrical portion 168 during tightening of the compression screw 170. A conical portion 169 of the removable seal device 160 is shown extending from the cylindrical portion 168 and expanding in diameter as the conical portion 169 extends away from the cylindrical portion 168. The conical portion 169 is shown including internal threads 187 configured to engage with the threads 195 of the support feature 194 of the fluidic tube 116.

Prior to connecting the fluidic coupling 150 to the receiver fitting 80 as shown in FIG. 9, first the compression screw 170 may be slid axially along the fluidic tube 116 until the second end 173 of the compression screw 170 abuts the second end 198 of the support feature 194. Once the compression screw 170 is in position, the first end 192 of the fluidic tube 116 may be inserted into an inner bore 188 of the removable seal device 160 until the first end 192 of the fluidic tube 116 is proximate a second sealing surface 167 of the removable seal device 160. Pushing the first end 192 of the fluidic tube 116 into the inner bore 188 simultaneously brings the internal threads 187 located on an internal surface 189 within the opening of the removable seal device 160 proximate the external threads 195 of the support feature 194. The removable seal device 160 may thereby be rotated about the support feature 194 to provide for removable attachment between the removable seal device 160 and the support feature 194. Once the removable seal device 160 is attached in this way to support feature 194, the removable seal device 160 may be connected to the fluidic coupling 150 so that even when the compression screw 170 is removed or otherwise disconnected from the receiver fitting 80 after use, the removable seal device 160 is configured to remain attached. However, intentionally unscrewing the removable seal device 160 from the support feature 194 of the fluidic tube 116 is configured to allow removal of the removable seal device 160 therefrom. Thus, the internal threads 187 of the internal surface 189 of the opening of the removable seal device 160 may be configured to facilitate removable attachment or securing of the removable seal device 160 to the fluidic coupling 150, and more particularly to the fluidic tube 116, or the support feature 194 of the fluidic tube 116.

Once the removable seal device 160 is attached to the fluidic coupling 150 in the removably attached manner described above, the fluidic coupling 150 may then be connected to a receiver fitting, such as the receiver fitting 80 as shown in FIG. 9. To accomplish connecting the fluidic coupling 150 within the receiver fitting 80, the threads 174 of the compression screw 170 are configured to engage with internal threads of the opening of the receiver fitting 80. As the compression screw 170 is turned within the receiver fitting 80 and moves axially into the opening of the receiver fitting 80, the second end 173 of the compression screw 170 pushes the second end 198 of the support feature 194, thereby pushing the attached fluidic tube 116. The support feature 194 and the internal surface 189 of the removable seal device 160 are each dimensioned so that the conical portion of the support feature 194 is located within the conical portion 169 of the internal surface 189 of the removable seal device 160. The support feature 194 may be under pressure with the internal surface 189 of the removable seal device 160 after tightening of the compression screw 170.

After being tightened by the compressions crew 170, the first sealing surface 166 of the removable seal device 160 is configured to create a first seal with a fitting sealing surface 84 of the receiver fitting 80 as shown in FIG. 9. Further, the second sealing surface 167 of the removable seal device 160 is configured to create a second seal with the first end 192 of a fluidic tube 116 as the first end 192 of the fluidic tube 116 is pushed forward by the compression screw 170 moving the support feature 194.

Once connected, fluid may be received through the fluidic tube 116. The seal body 161 of the removable sealing device 160 includes an inner channel 165 or opening configured to receive a flow of fluid therethrough from the first end 192 of the fluidic tube 116. The fluid may then flow through the channel 85 of the receiver fitting 80 and eventually into the second fluidic coupling (not shown) that is attached to the second receiver body 86. For other types of receiver fittings, it should be understood that the fluidic coupling 150 may operate and connect in the same manner as described hereinabove with respect to the operation and connection with the receiver fitting 80.

Figure 10:
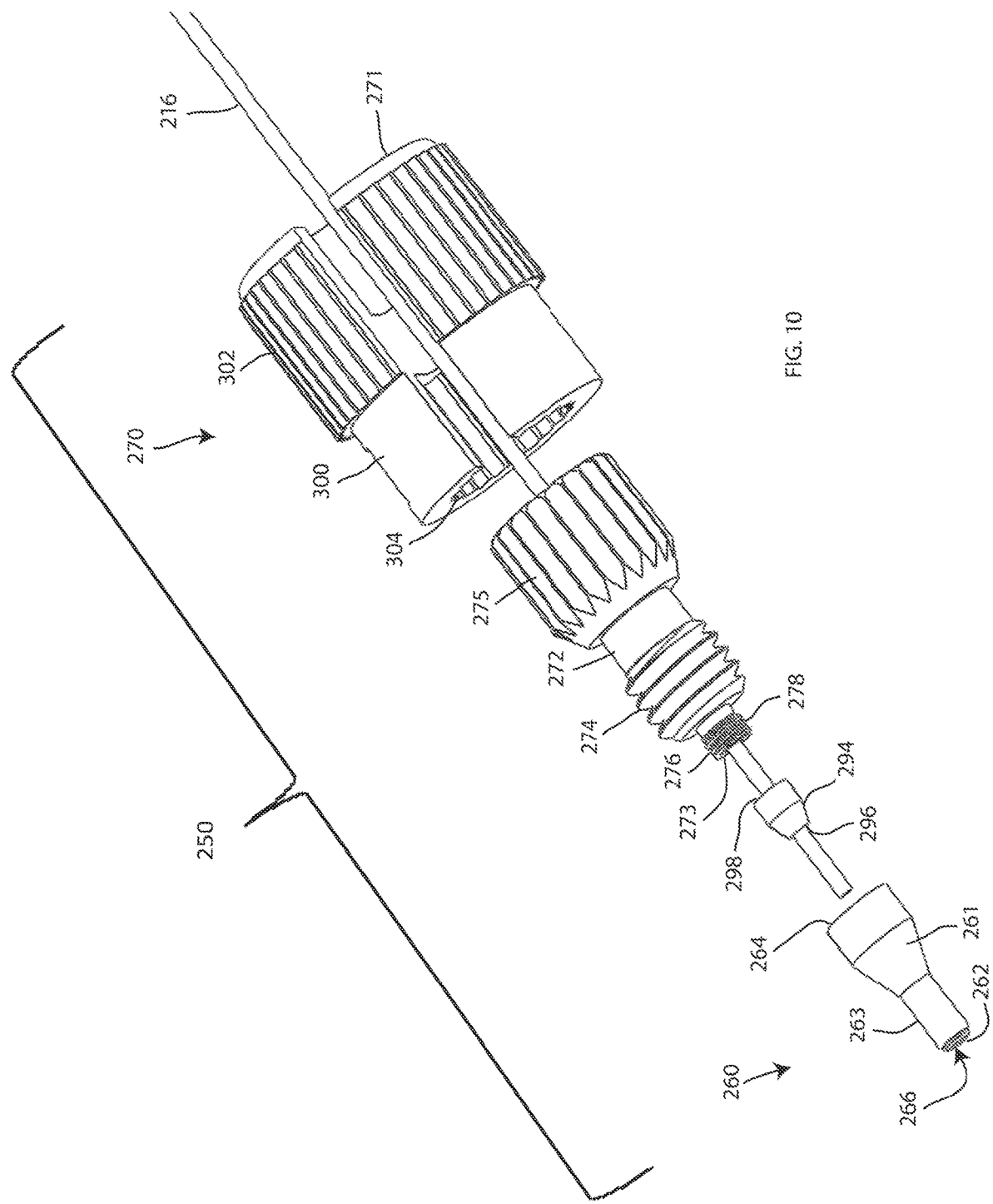
FIG. 10 depicts a partially exploded view of another embodiment of a fluidic coupling including a removable seal device.
Figure 11:
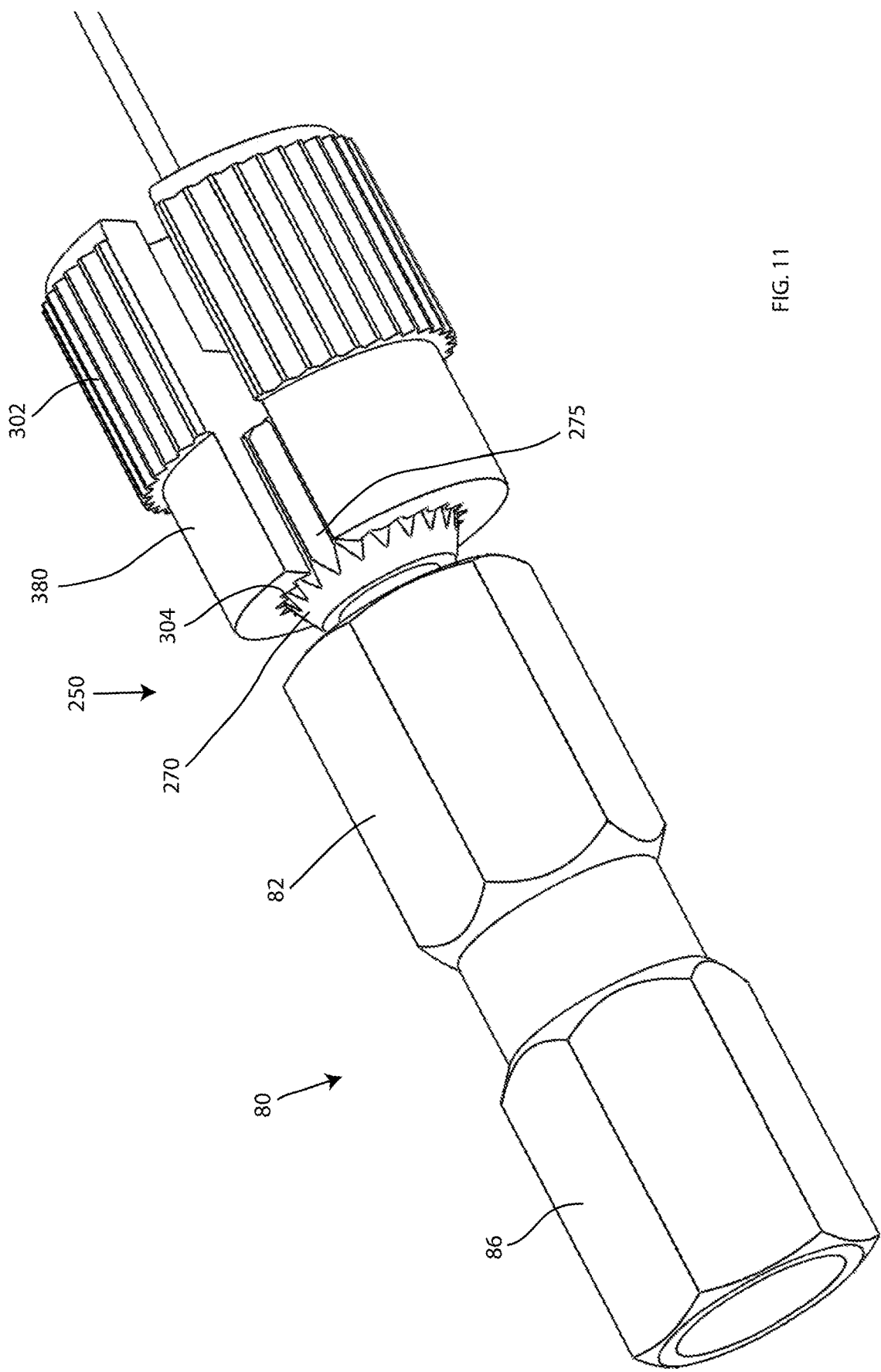
FIG. 11 depicts a perspective view of the fluidic coupling of FIG. 10 attached to a receiver fitting.
Figure 12:
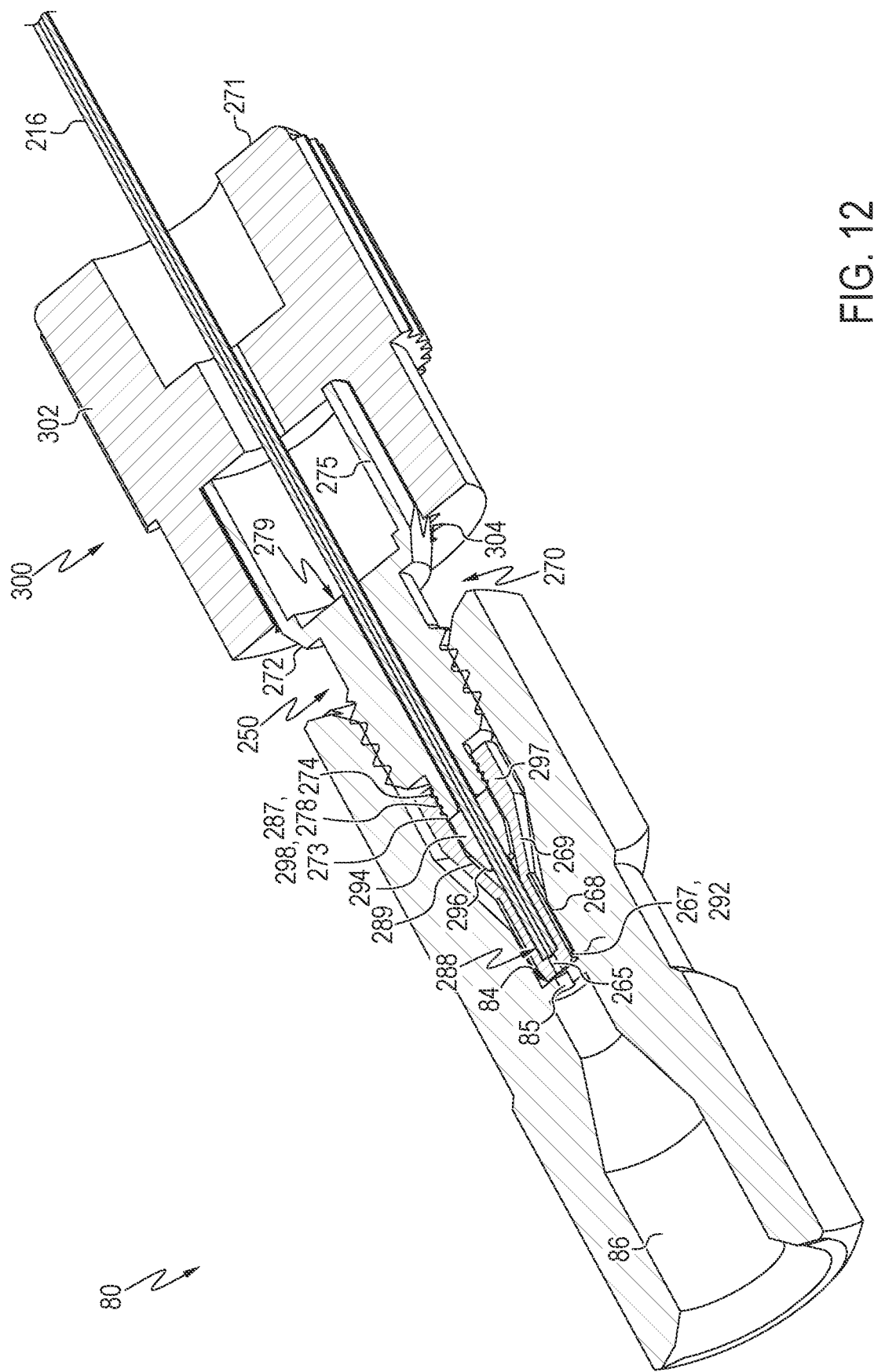
FIG. 12 depicts a side cross sectional view of the fluidic coupling of FIGS. 10 and 11 attached to the receiver fitting of FIG. 11.

Referring now to FIGS. 10-12, various views of another fluidic coupling 250 is shown. In particular, FIG. 10 depicts a partially exploded view of the fluidic coupling 250 including a removable seal device 60. FIG. 11 depicts a perspective view of the fluidic coupling 250 of FIG. 10 attached to the receiver fitting 80. FIG. 12 depicts a side cross sectional view of the fluidic coupling 250 of FIGS. 10 and 11 attached to the receiver fitting 80.

As shown in FIG. 10, the fluidic coupling 250 includes a fluidic tube 216 having a support feature 294, a compression screw 270 and the removable seal device 260. The fluidic tube 216 is shown inserted into the compression screw 270 such that the compression screw 270 is rotatable about the fluidic tube 216. The removable seal device 260 extends between a first end 262 and a second end 264. The second end 264 of the removable seal device 260 may include an opening that is configured to receive a first end 292 of the fluidic tube 216 (shown in FIG. 6). The removable seal device 260 is configured to form a first seal between an end 262 of the removable seal device 260 and a fitting sealing surface of a receiver fitting, while also being configured to create a second seal between an internal cavity of the removable seal device 260 and the first end 292 of the fluidic tube 216 (shown in more detail in FIG. 12).

As shown in FIG. 10, the removable seal device 260 is not integrally connected to the first end 292 of the fluidic tube 216. Rather, the removable seal device 260 is removably attached to the first end 292 of the fluidic tube 216 in a manner that allows for the removable seal device 260 to become unattached, removed, or decoupled from the first end 292 of the fluidic tube 216 after use. However, the removable seal device 260 may be configured to be removed from a receiver fitting while maintaining attachment to the first end 292 of the fluidic tube 216 in a manner that maintains its attachment when the fluidic coupling 250 is being removed from a receiver fitting. Thus, the removable seal device 260 includes structure, described below, that is configured to removably attach to the compression screw 270. In embodiments described herein, the removable seal device 260 is configured to maintain this attachment as the fluidic coupling 250 is being removed from a receiver fitting.

Like the fluidic tubes 16, 116, the fluidic tube 216 may be made of a plastic, glass or metal material, such as stainless steel, titanium, nitronic 60 and Hastelloy. The support feature 294 may further be made of a durable material. For example, the support feature 294 may also be made of metal, such as stainless steel, titanium, nitronic 60 and Hastelloy. Likewise, the compression screw 270 may be made of a metallic material, such as stainless steel, titanium, nitronic 60 and Hastelloy. In one embodiment, the compression screw 260 and the support feature 294 may be made from different materials than each other. This may minimize the risk of material damage between the two components 270, 294. Unlike the fluidic tube 216, the support feature 294 and the compression screw 270, the removable seal device 260 may be made of a compliant or flexible material. For example, the removable seal 260 may be a polymer material such as polyether ether ketone (PEEK), or the like. The removable nature of the removable seal device 260 allows an operator to replace the seal after it is damaged due to natural use or an improper installation. The removable nature of the removable seal device 260 also allows replacement of the removable seal device 260 without requiring replacement of the entire length of the fluidic tube 216.

As shown in FIG. 10, the compression screw 270 extends along an axis from a first end 271 to a second end 273. The compression screw 270 includes a main body 272 that includes a threaded portion 274. The threaded portion 274 may be configured to engage with threads of a receiver fitting to attach the fluidic coupling 250 thereto. The compression screw 270 further includes an extending portion 276 extending from the main body 272. The extending portion 276 extends along the axis of the compression screw 270 from the main body 272 and includes a smaller diameter than the threaded portion 274 of the main body 272. The extending portion 276 includes threads 278 that cover the length of the extending portion 276.

The fluidic coupling 250 includes a support feature 294 that is fixed proximate the first end 292 of the fluidic tube 216. The support feature 294 extends between a first end 296 and a second end 298. The support feature 294 includes a conical portion proximate the first end 296 that enlarges in diameter as the conical portion extends away from the first end 292 of the fluidic tube 216. The support feature 294 includes a cylindrical portion that extends from the conical portion. The support feature 294 may be an integral component of the fluidic tube 216, or may alternatively be permanently attached to the fluidic tube, such as by welding, an epoxy or adhesive, or the like. Thus, the support feature 294 may be affixed in manner that permanently maintains its position along the axis of the fluidic tube 216. The support feature 294 may include a materially solid structure having an opening, bore or channel extending axially along its length that is dimensioned to receive the fluidic tube 216.

The removable seal device 260 includes a seal body 261. The seal body 261 extends from the first end 262 with a cylindrical region. A metallic support sleeve 263 surrounds the cylindrical region. The main body 261 further includes a conical portion that extends from the cylindrical region. A larger diameter cylindrical region extends from the conical portion to the second end 264 of the removable seal device 260. The interior dimensions of the removable seal device 260 are shown in FIG. 12 and will be described herein below.

Referring now to FIG. 11, the fluidic coupling 250 is shown connected to the receiver fitting 80. The receiver fitting 80 is shown for exemplary purposes. Like the fluidic couplings 50, 150, the fluidic coupling 250 and/or the principles described herein and embodied by the fluidic coupling 250, may be utilized with any appropriate receiver fitting within any chromatography system. Further, as shown in FIGS. 10 and 11, the compression screw 270 of the fluidic coupling may be different than the compression screws 70, 170 described hereinabove. The compressions crew 270 may include straight knurls 275 or protrusions configured to interface with recesses 304 of a torquing tool 380 having additional knurls 302 configured to allow ease of grip for tightening the compression screw 270. It should be understood that this approach to torquing the compression screw 270 may be applicable to any embodiments of the present invention, including those from FIGS. 4-9.

FIG. 12 shows a cutaway view of the fluidic coupling 250 attached to the receiver fitting 80. As shown, the compression screw 270 of the fluidic coupling includes an opening 279 that extends the axial length of the compression screw 270 within which the fluidic tube 216 resides. The fluidic tube 216 is thereby configured to extend through the opening 279 and extend out from each of the first end 271 and the second end 273 of the compressions crew 270.

As shown, the first end 292 of the fluidic tube 216 is located within an opening of the removable seal device 260. Specifically, the seal body 261 of the removable seal device 260 includes a cylindrical portion 268 extending from the first end 262 which is dimensioned to closely surround the fluidic tube 216. For example, the cylindrical portion 268 may include an internal bore or other opening that is dimensioned to receive the first end 292 of the fluidic tube 216 and an axial length of the fluidic tube 216. In one embodiment, the internal bore may create an interference fit with the fluidic tube 216. The metallic support sleeve 263 shown more clearly in FIG. 10 surrounds this cylindrical portion 268 of the removable seal device 260 and may be configured to maintain the structural integrity of the thin cylindrical portion 268 during tightening of the compression screw 270. A conical portion 269 of the removable seal device 260 is shown extending from the cylindrical portion 268 and expanding in diameter as the conical portion 269 extends away from the cylindrical portion 268. Extending from the conical portion 269 is another cylindrical portion 297. Within an inner surface 289 of the opening of the cylindrical portion 297 are threads 287 configured to engage with the threads 278 of the compression screw 270.

Prior to connecting the fluidic coupling 250 to the receiver fitting 80 as shown in FIG. 12, first the compression screw 270 may be slid axially along the fluidic tube 216 until the second end 273 of the compression screw 270 abuts the second end 298 of the support feature 294. Once the compression screw 270 is in position, the first end 292 of the fluidic tube 216 may be inserted into an inner bore 288 of the removable seal device 260 until the first end 292 of the fluidic tube 216 is proximate a second sealing surface 267 of the removable seal device 260. Pushing the first end 292 of the fluidic tube 216 into the inner bore 288 simultaneously brings the threads 287 of the cylindrical portion 297 of the removable seal device 260 proximate the threads 278 of the compression screw 270. At this point, the removable seal device 260 may be rotated about the compression screw 270 in order to engage the threads 287 with the threads 278 and create removable attachment of the removable seal device 260 to the compression screw 270. Once the removable seal device 260 is attached in this way to compression screw 270, the removable seal device 260 may be connected to the compression screw 270 so that even when the compression screw 270 is removed or otherwise disconnected from the receiver fitting 80 after use, the removable seal device 260 is configured to remain attached. However, intentionally unscrewing the removable seal device 260 from the compression screw 270 is configured to allow its removal therefrom. Thus, the threads 287 of the internal surface 289 of the opening of the removable seal device 260 may be configured to facilitate removable attachment or securing of the removable seal device 260 to the second end 273 of the compression screw 270.

Once the removable seal device 260 is attached to the compression screw 270 in the removably attached manner described above, the fluidic coupling 250 may then be connected to a receiver fitting, such as the receiver fitting 80 as shown in FIG. 12. To accomplish connecting the fluidic coupling 250 within the receiver fitting 80, the threads 274 of the compression screw 270 are configured to engage with internal threads of the opening of the receiver fitting 80. As the compression screw 270 is turned within the receiver fitting 80 and moves axially into the opening of the receiver fitting 80, the second end 273 of the compression screw 270 pushes the second end 298 of the support feature 294, thereby pushing the attached fluidic tube 216. The support feature 294 and the internal surface 289 of the removable seal device 260 are each dimensioned so that the conical portion of the support feature 294 is located within the conical portion 269 of the internal surface 289 of the removable seal device 260. The support feature 294 may be under pressure with the internal surface 289 of the removable seal device 260 after tightening of the compression screw 270.

After being tightened by the compressions crew 270, the first sealing surface 266 of the removable seal device 260 is configured to create a first seal with the fitting sealing surface 84 of the receiver fitting 80 as shown in FIG. 12. Further, the second sealing surface 267 of the removable seal device 260 is configured to create a second seal with the first end 292 of the fluidic tube 216 as the first end 292 of the fluidic tube 216 is pushed forward by the compression screw 270 moving the support feature 94.

Once connected, fluid may be received through the fluidic tube 216. The seal body 261 of the removable sealing device 260 includes an inner channel 265 or opening configured to receive a flow of fluid therethrough from the first end 292 of the fluidic tube 216. The fluid may then flow through a channel 285 of the receiver fitting 80 and eventually into a second fluidic coupling (not shown) that is attached to the second receiver body 86. For other types of receiver fittings, it should be understood that the fluidic coupling 250 may operate and connect in the same manner as described hereinabove with respect to the operation and connection with the receiver fitting 80.

Methods of fluidic coupling are further contemplated herein. A method of fluidic coupling in accordance with embodiments described herein may include providing a fluidic tube, such as one of the fluidic tubes 16, 116, 216, including an end surface, such as one of the end surfaces 92, 192, 292. Methods may include providing a compression screw, such as one of the compression screws 70, 170, 270. Methods may include providing a removable seal device, such as one of the removable seal devices 60, 160 260, including a seal body, such as one of the seal bodies 61, 161, 261, extending between a first end, such as one of the first ends 62, 162, 262, and a second end, such as one of the second ends 64, 164, 264, the removable seal device including an inner channel, such as one of the inner channels 65, 165, 265. In accordance with methods described herein, the first end of the removable seal device includes a first sealing surface, such as one of the first sealing surfaces 66, 166, 266, and the removable seal device includes a second sealing surface, such as one of the second sealing surfaces 67, 167, 267. Methods further include providing a receiver fitting, such as the receiver fitting 80.

Methods contemplated herein further include removably attaching the removable seal device to the compression screw, tightening the compression screw to the receiver fitting, creating a first seal between the first sealing surface and a fitting sealing surface of the receiver fitting, and creating a second seal between the second sealing surface and the end surface of a fluidic tube. Methods still further include receiving fluid from the fluidic tube by the fluidic channel, providing the received fluid from the fluidic channel to a channel of the receiver fitting, such as the channel 85. Methods further include loosening the compression screw from the receiver fitting, simultaneously removing the compression screw, the fluidic tube and the removable seal device from the receiver fitting, and unattaching the removable seal device from the compression screw after the simultaneously removing.

Methods still further include providing a providing a second removable seal device after the first removable seal device has been removed, such as one of the removable seal devices 60, 160, 260. Methods include removably attaching the second removable seal device to the compression screw, tightening the compression screw to the receiver fitting after the removably attaching the second removable seal device to the compression screw, creating a first seal between the first sealing surface of the second removable seal device and the fitting sealing surface of the receiver fitting; and creating a second seal between the second sealing surface of the second removable seal device and the end surface of a fluidic tube.

Methods of the present invention thereby provide for removing, unattaching or decoupling the removable seal device from the first end of the fluidic tube after use. Methods further include removably attaching the removable seal device to the end of the tube and maintaining attachment when the fluidic coupling is being removed from the receiver fitting. Methods further include attaching the removable seal device to at least one of the tube, a support feature that is affixed to the tube, a compression screw, or any other portion of a fluidic coupling. Methods include replacing the removable seal device after wear and tear, without replacing the entire length of tube and other components of the fluidic coupling.

While the invention has been shown and described with reference to specific embodiments, it should be understood by those skilled in the art that various changes in form and detail may be made therein without departing from the spirit and scope of the invention as recited in the accompanying claims. For example, in some embodiments, the removable seal device may not include a support sleeve, or may include a support sleeve that is not made of a metallic material. Other variations are contemplated without departing from the scope of inventions described herein.

What is claimed is:

1. A removable seal device for fluidic coupling for use in a chromatography system comprising:
    a seal body extending between a first end and a second end, the seal body including an inner channel configured to receive a flow of a fluid, wherein the first end of the seal body includes a first sealing surface configured to create a first seal with a fitting sealing surface of a receiver fitting, and wherein the seal body incudes a second sealing surface configured to create a second seal with an end of a fluidic tube, wherein the removable seal is configured to be removably secured to at least one of the fluidic tube, a support feature fixed to the fluidic tube, and a compression screw, such that untightening of the compression screw from the receiver fitting causes the removable seal device to be removed from the receiver fitting,
    wherein the seal body includes a cylindrical portion extending from the first end, and a conical portion extending from the cylindrical portion and expanding in diameter as the conical portion extends from the cylindrical portion,
    wherein the cylindrical portion includes an internal bore dimensioned to receive the end of the fluidic tube and a length of the fluidic tube,
    the seal body further including an internal surface within at least one of the conical portion and a cylindrical extended portion of the conical portion, the internal surface including threads configured to facilitate the removably securing to the at least one of the fluidic tube, the support feature fixed to the fluidic tube, and the compression screw; and
    a metallic support sleeve surrounding the cylindrical portion configured to support the seal body.

2. A fluidic coupling for use in a chromatography system comprising:
    a fluidic tube including an end surface, wherein the fluidic tube includes a support feature fixed to the fluidic tube proximate the end surface;
    a compression screw having a main body extending along an axis from a first end to a second end, the compression screw including a compression screw threaded portion configured to engage with internal threads of a receiver fitting, the compression screw including an opening extending from the first end to the second end along the axis, wherein the fluidic tube is configured to extend through the opening; and
    a removable seal device for fluidic coupling including a seal body extending between a first end and a second end, the seal body including an inner channel configured to receive a flow of a fluid, wherein the first end of the seal body includes a first sealing surface configured to create a first seal with a fitting sealing surface of a receiver fitting, and wherein the seal body incudes a second sealing surface configured to create a second seal with an end of a fluidic tube, wherein the removable seal device is configured to be removably secured to at least one of the fluidic tube, the support feature fixed to the fluidic tube, and a compression screw, such that untightening of the compression screw from the receiver fitting causes the removable seal device to be removed from the receiver fitting, wherein the support feature has a greater diameter than the fluidic tube, the support feature configured to abut the first end of the compression screw, the support feature including a support feature threaded portion, and wherein the threads of the internal surface of the seal body are configured to engage the threaded portion of the removable seal device, wherein the seal body includes a cylindrical portion extending from the first end, and a conical portion extending from the cylindrical portion and expanding in diameter as the conical portion extends from the cylindrical portion, wherein the cylindrical portion includes an internal bore dimensioned to receive the end of the fluidic tube and a length of the fluidic tube, the seal body further including an internal surface within at least one of the conical portion and a cylindrical extended portion of the conical portion, the internal surface including threads configured to facilitate the removably securing to the at least one of the fluidic tube, the support feature fixed to the fluidic tube, and the compression screw.

3. The fluidic coupling of claim 2, further comprising a metallic support sleeve surrounding the cylindrical portion configured to support the seal body.

4. A method of fluidic coupling in a chromatography system comprising:
providing the fluidic coupling of claim 2;
providing the receiver fitting;
removably attaching the removable seal device to the compression screw;
tightening the compression screw to the receiver fitting;
creating a first seal between the first sealing surface and a fitting sealing surface of the receiver fitting; and
creating a second seal between the second sealing surface and the end surface of a fluidic tube.

5. The method of claim 4, further comprising:
receiving fluid from the fluidic tube by a fluidic channel; and
providing the received fluid from the fluidic channel to a channel of the receiver fitting.

6. The method of claim 5, further comprising:
loosening the compression screw from the receiver fitting;
simultaneously removing the compression screw, the fluidic tube and the removable seal device from the receiver fitting; and
unattaching the removable seal device from the compression screw after the simultaneously removing.

7. The method of claim 6, further comprising:
providing a second removable seal device having a seal body extending between a first end and a second end, the second removable seal device including an inner channel, wherein the first end of the second removable seal device includes a first sealing surface, and wherein the second removable seal device includes a second sealing surface;
removably attaching the second removable seal device to the compression screw;
tightening the compression screw to the receiver fitting after the removably attaching the second removable seal device to the compression screw;
creating a first seal between the first sealing surface of the second removable seal device and the fitting sealing surface of the receiver fitting; and
creating a second seal between the second sealing surface of the second removable seal device and the end surface of a fluidic tube.

8. The method of claim 4, wherein the compression screw is made of metal and wherein the removable seal device is made of a flexible polymer material.

9. The method of claim 8, wherein the support feature is made of metal.

10. The method of claim 4, wherein the support feature extends between a first end and a second end and includes a conical portion proximate the first end that enlarges in diameter as the conical portion extends away from the first end.

11. The fluidic coupling of claim 2, wherein the compression screw is made of metal and wherein the removable seal device is made of a flexible polymer material.

12. The fluidic coupling of claim 11, wherein the support feature is made of metal.

13. The fluidic coupling of claim 2, further comprising the receiver fitting, wherein the receiver fitting includes internal threads configured to engage with the compression screw threaded portion.

14. The fluidic coupling of claim 2, wherein the support feature extends between a first end and a second end and includes a conical portion proximate the first end that enlarges in diameter as the conical portion extends away from the first end.

15. A fluidic coupling for use in a chromatography system comprising:
a fluidic tube including an end surface;
a compression screw having a main body extending along an axis from a first end to a second end, the compression screw including a first threaded portion configured to engage with internal threads of a receiver fitting, the compression screw including an opening extending from the first end to the second end along the axis, wherein the fluidic tube is configured to extend through the opening, the compression screw further including an extending portion extending from the main body to the first end, the extending portion including a smaller diameter than the main body, the extending portion including a second threaded portion; and
a removable seal device for fluidic coupling including a seal body extending between a first end and a second end, the seal body including an inner channel configured to receive a flow of a fluid, wherein the first end of the seal body includes a first sealing surface configured to create a first seal with a fitting sealing surface of a receiver fitting, and wherein the seal body incudes a second sealing surface configured to create a second seal with an end of a fluidic tube, wherein the removable seal device is configured to be removably secured to at least one of the fluidic tube, the support feature fixed to the fluidic tube, and a compression screw, such that untightening of the compression screw from the receiver fitting causes the removable seal device to be removed from the receiver fitting, wherein the seal body includes a cylindrical portion extending from the first end, and a conical portion extending from the cylindrical portion and expanding in diameter as the conical portion extends from the cylindrical portion, wherein the cylindrical portion includes an internal bore dimensioned to receive the end of the fluidic tube and a length of the fluidic tube, the seal body further including an internal surface within at least one of the conical portion and a cylindrical extended portion of the conical portion, the internal surface including threads configured to facilitate the removably securing to the at least one of the fluidic tube, the support feature fixed to the fluidic tube, and the compression screw, and wherein the threads of the internal surface of the seal body are configured to engage the second threaded portion of the compression screw.

16. The fluidic coupling of claim 15, further comprising a metallic support sleeve surrounding the cylindrical portion configured to support the seal body.

17. The fluidic coupling of claim 15, wherein the compression screw is made of metal and wherein the removable seal device is made of a flexible polymer material.

18. The fluidic coupling of claim 17, wherein the support feature is made of metal.

19. The fluidic coupling of claim 15, further comprising the receiver fitting, wherein the receiver fitting includes internal threads configured to engage with the first threaded portion of the compression screw.

20. The fluidic coupling of claim 15, wherein the support feature extends between a first end and a second end and includes a conical portion proximate the first end that enlarges in diameter as the conical portion extends away from the first end.

* * * * *